(12) United States Patent
Motley

(10) Patent No.: US 9,154,234 B2
(45) Date of Patent: Oct. 6, 2015

(54) EXTENDED RANGE UNDERSEA COMMUNICATION SYSTEM

(71) Applicant: Cecil F. Motley, Rolling Hills Estates, CA (US)

(72) Inventor: Cecil F. Motley, Rolling Hills Estates, CA (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 79 days.

(21) Appl. No.: 14/050,031

(22) Filed: Oct. 9, 2013

(65) Prior Publication Data

US 2015/0098705 A1 Apr. 9, 2015

(51) Int. Cl.
*H04B 10/80* (2013.01)
*H04B 13/02* (2006.01)

(52) U.S. Cl.
CPC ............... *H04B 10/80* (2013.01); *H04B 13/02* (2013.01)

(58) Field of Classification Search
None
See application file for complete search history.

(56) References Cited

U.S. PATENT DOCUMENTS

| 4,493,114 | A | 1/1985 | Geller et al. |
| 5,307,194 | A | 4/1994 | Hatton et al. |
| 6,400,482 | B1 | 6/2002 | Lupton et al. |
| 7,805,079 | B1 | 9/2010 | Meyers et al. |
| 2007/0166045 | A1 | 7/2007 | Wang |
| 2007/0253713 | A1 | 11/2007 | Reilly et al. |
| 2008/0240718 | A1* | 10/2008 | Werner et al. .......... 398/96 |

FOREIGN PATENT DOCUMENTS

WO  WO 2008/027072 A2 * 3/2008

OTHER PUBLICATIONS

Baykal et al., Cost Action IC1101 Optical Wireless Communications—An Emerging Technology (OPTICWISE), 2013, Underwater Optical Wireless Communication, XP-002734605, pp. 1-3.*
Notification of Transmittal of the International Search Report and The Written Opinion mailed Feb. 4, 2015; Authorized Officer Ribbe, Asa, completed Jan. 16, 2015.
Golub, Ilya, and Theodore Mirtchev. "Absorption-free beam generated by a phase-engineered optical element," *Optics letters* 34,10 (2009): 1528-1530.

* cited by examiner

*Primary Examiner* — Darren E Wolf
(74) *Attorney, Agent, or Firm* — Tarolli, Sundheim, Covell & Tummino LLP

(57) ABSTRACT

A transmitter includes an ultraviolet (UV) encoder conversion block that receives network data from a network interface to generate a conversion output. The UV conversion block converts the network data to a modulated signal that drives a plurality of multi-spectrum sources to generate the conversion output. A wave front optical component receives the conversion output from the UV conversion block and generates an output beam. The wave front optical component employs refraction compensation to mitigate absorption and scattering of the output beam in a liquid medium. An isotropic transmitter cluster transmits the output beam received from the wave front optical component as photon energy in the liquid medium. The isotropic transmitter cluster includes at least two transmitting nodes to facilitate transmission of the photon energy in a plurality of directions in the liquid medium.

20 Claims, 15 Drawing Sheets

FIG. 9

| Bit 1 Sample 1 | Bit 2 Sample 1 | Bit 3 Sample 1 | Bit 4 Sample 1 | Bit 5 Sample 1 | Bit 6 Sample 1 | Bit 7 Sample 1 | Bit 8 Sample 1 |
|---|---|---|---|---|---|---|---|
| Bit 1 Sample 2 | Bit 2 Sample 2 | | | | | | |
| Bit 1 Sample 3 | | | | | | | |
| Bit 1 Sample 4 | | | | | | | |
| Bit 1 Sample 5 | | | | | | | |
| Bit 1 Sample 6 | | | | | | | |
| Bit 1 Sample 7 | | | | | | | Bit 8 Sample 7 |
| Bit 1 Sample 8 | | | | | | Bit 7 Sample 8 | Bit 8 Sample 8 |

BITS
SAMPLES

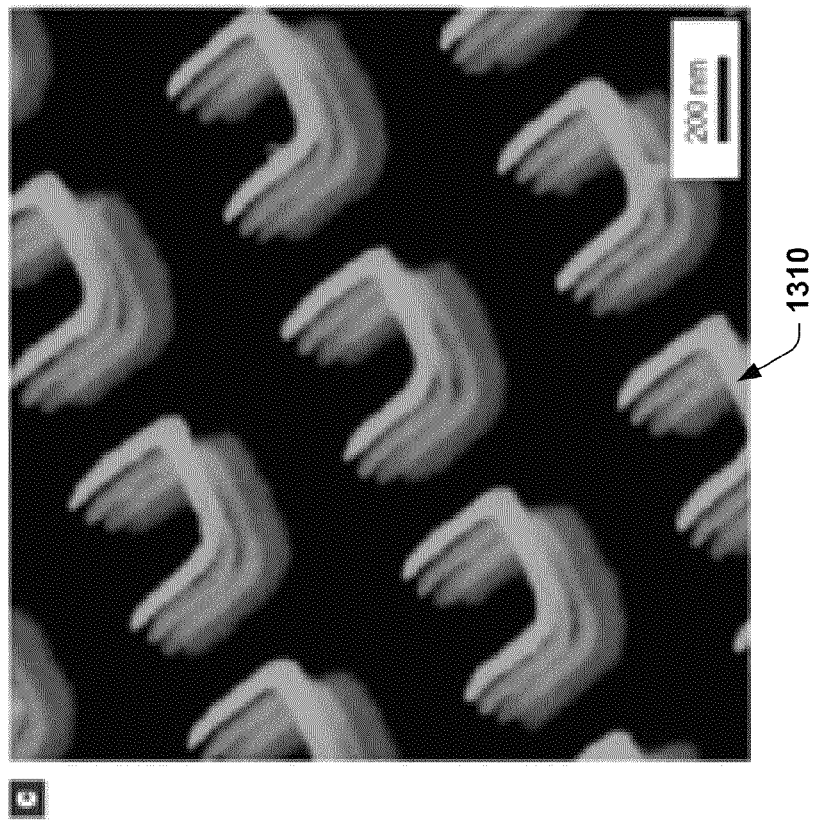
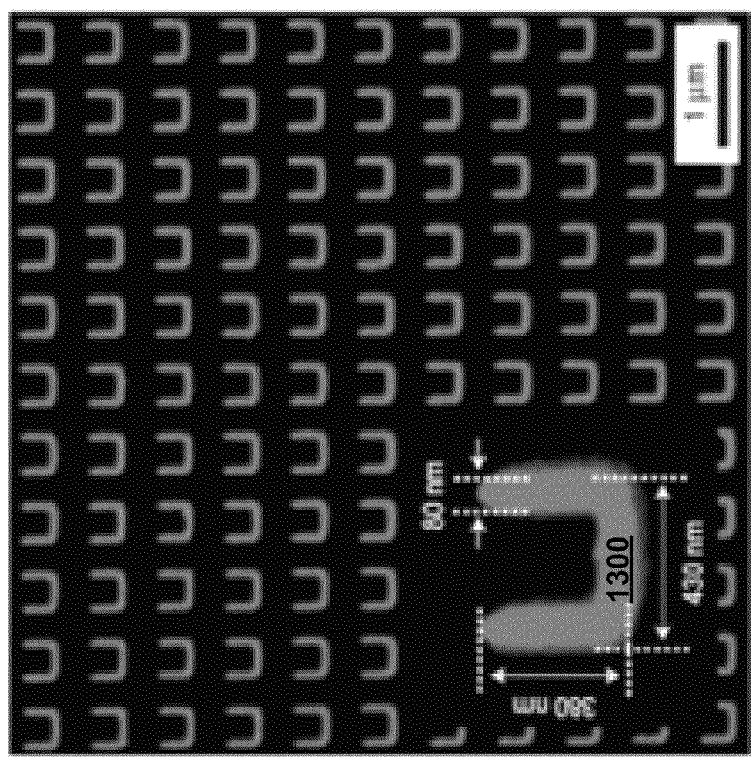
FIG. 13

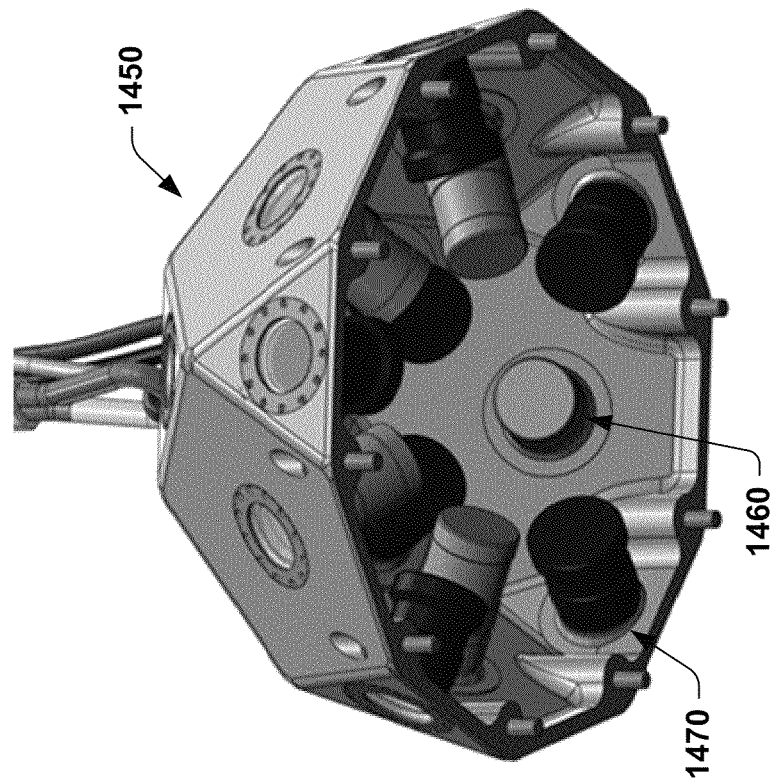
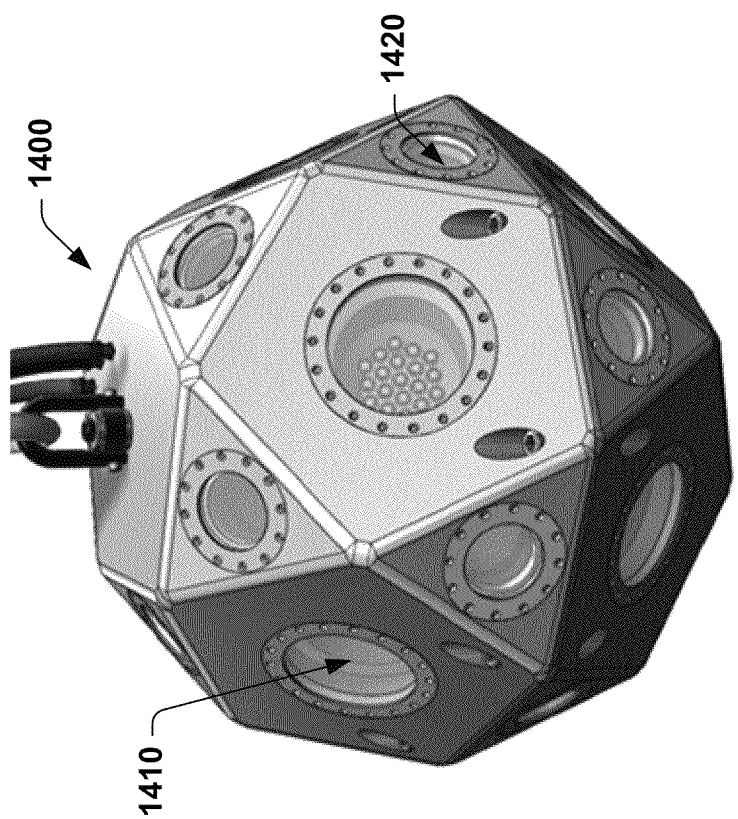
FIG. 14

US 9,154,234 B2

EXTENDED RANGE UNDERSEA COMMUNICATION SYSTEM

TECHNICAL FIELD

This disclosure relates to communication systems, and more particularly to systems that provide extended wireless network capabilities in a liquid medium such as water.

BACKGROUND

Underwater acoustic communication involves sending and receiving messages below water via acoustic waves. Unlike a transmission medium such as air for terrestrial wireless communications using electromagnetic spectrum waves, the transmission medium for underwater messages is the water itself which presents a host of design challenges. Underwater communication is difficult due to factors such as multipath propagation, time variations of the communications channel, small available bandwidth, and strong signal attenuation, especially over long ranges. In most underwater communication systems, there are low data rates compared to terrestrial communication, since underwater communication typically employs acoustic waves instead of electromagnetic waves for transmission of data. Since most undersea communications is typically performed acoustically, communications are limited to a distance of about 200 meters at data rates of 10 kbps or less. The acoustic delay in water also severely restricts sound or ultrasound as a long range communication media, however.

Designing a reliable underwater acoustic channel presents a communication systems designer with many difficulties. Some distinguishing characteristics of the channel are frequency-dependent propagation loss, severe multipath distortions, and low speed of sound propagation. None of these characteristics are nearly as pronounced in land-based radio channels—the fact that makes underwater wireless communication extremely difficult, and necessitates dedicated system design. Some non-acoustic attempts have also been made to provide underwater wireless communications using waves other than acoustic waves. For example, the blue and blue-green regions of the electromagnetic spectrum have been used for undersea communications with limited results due to high signal attenuation in the 535 nanometer region of the spectrum, for example. Thus, with either acoustic and/or electromagnetic wave transmission in water, communication distance, data rate, and system reliability remain limited.

SUMMARY

This disclosure relates to extended range communications systems for wireless communications in a liquid medium such as water. A transmitter includes an ultraviolet (UV) encoder conversion block that receives network data from a network interface to generate a conversion output. The UV encoder conversion block converts the network data to a modulated signal that drives a plurality of multi-spectrum sources to generate the conversion output. A wave front optical component receives the conversion output from the UV encoder conversion block and generates an output beam. The wave front optical component employs refraction compensation to mitigate absorption and scattering of the output beam in a liquid medium. An isotropic transmitter cluster transmits the output beam received from the wave front optical component as photon energy in the liquid medium. The isotropic transmitter cluster includes at least two transmitting nodes to facilitate transmission of the photon energy in a plurality of directions in the liquid medium.

In another example, a receiver includes an isotropic receiver cluster to receive photon energy having modulated network data from a liquid medium and to generate cluster output data. The isotropic receiver cluster includes at least two receiving nodes to facilitate reception of the photon energy from a plurality of directions in the liquid medium. A photon receiver receives the cluster output data from isotropic receiver and generates receiver output data. The photon receiver includes a multi-spectrum discriminator to filter and separate the received photon energy into individual spectrum bands. The photon receiver also includes a photon counter array to store the individual spectrum bands generated by the multi-spectrum discriminator into discrete receiving data elements in the array. An ultraviolet (UV) decoder conversion block decodes the modulated network data from the discrete receiving data elements of the photon counter array.

In yet another example, a system includes an ultraviolet (UV) encoder conversion block that receives network data from a network interface to generate a conversion output. The UV conversion block converts the network data to a modulated signal that drives a plurality of multi-spectrum sources to generate the conversion output. A wave front optical component receives the conversion output from the UV conversion block and generates an output beam. The wave front optical component employs refraction compensation to mitigate absorption and scattering of the output beam in a liquid medium. An isotropic transmitter cluster transmits the output beam received from the wave front optical component as photon energy in the liquid medium. The isotropic transmitter cluster includes at least two transmitting nodes to facilitate transmission of the photon energy in a plurality of directions in the liquid medium. The system includes an isotropic receiver cluster to receive photon energy having modulated network data from the liquid medium and to generate cluster output data. The isotropic receiver cluster includes at least two receiving nodes to facilitate reception of the photon energy from a plurality of directions in the liquid medium.

BRIEF DESCRIPTION OF THE DRAWINGS

FIG. 9 is an example photon counting array configuration for an extended range communication system for wireless communications in a liquid medium.

FIG. 13 illustrates an optical negative index of material for an extended range communication system for wireless communications in a liquid medium.

FIG. 14 illustrates an example configuration for icosi-dodecahedron transceiver pressure vessel for an extended range communication system for wireless communications in a liquid medium.

DETAILED DESCRIPTION

This disclosure relates to extended range communications systems for transmission of wireless network messages in a liquid medium such as water. A network interface is provided that can communicate via network protocols such as the Internet Protocol (IP), for example. Message data from the network interface can be modulated and converted to energy in the ultraviolet (UV) spectrum (e.g., about 380 nm to about 450 nm) to increase the range of communications in the liquid medium over conventional systems. Thus, in one example, an undersea communication system can be based on network messages that are converted to UV light that can be processed via programmable digital signal processors (DSPs) to perform the conversion. Such conversion can include network-to-UV conversion on the transmission side and UV-to-network conversion on the receiving side of the liquid medium. Conversion output from the DSPs can be processed via a personal computer (PC), for example, for subsequent transmission and/or reception. Output from the computer can be coupled to refraction compensating wave front optics to further increase distance and reduce losses in the liquid medium. Beams generated from the wave front optics can be transmitted in the liquid medium via an undersea lens cluster in one example to further increase the range of communications in multiple directions.

In one specific example, the communication range an be extended by the wave front optics which are configured to provide refraction compensation which can include employment of a Diffraction-less Bessel Beam (DBB) in one example or via Negative Index of Refraction Materials (NIMs), in another example, to mitigate absorption losses and scattering in the liquid medium. The transmit range of the communications system can be further extended via undersea optical lens clusters which provides isotropic propagation of the network messages that have been converted to UV beams. The receiver can also be implemented with a lens cluster which focuses the input collected photon energy on to a photon counting array. The resulting transmitting and receiving network system provides undersea communication over ranges exceeding 1 km at data rates of 1 megabit or higher with a bit error rate (BER) of at least $10^{-6}$, for example.

Figure 1:
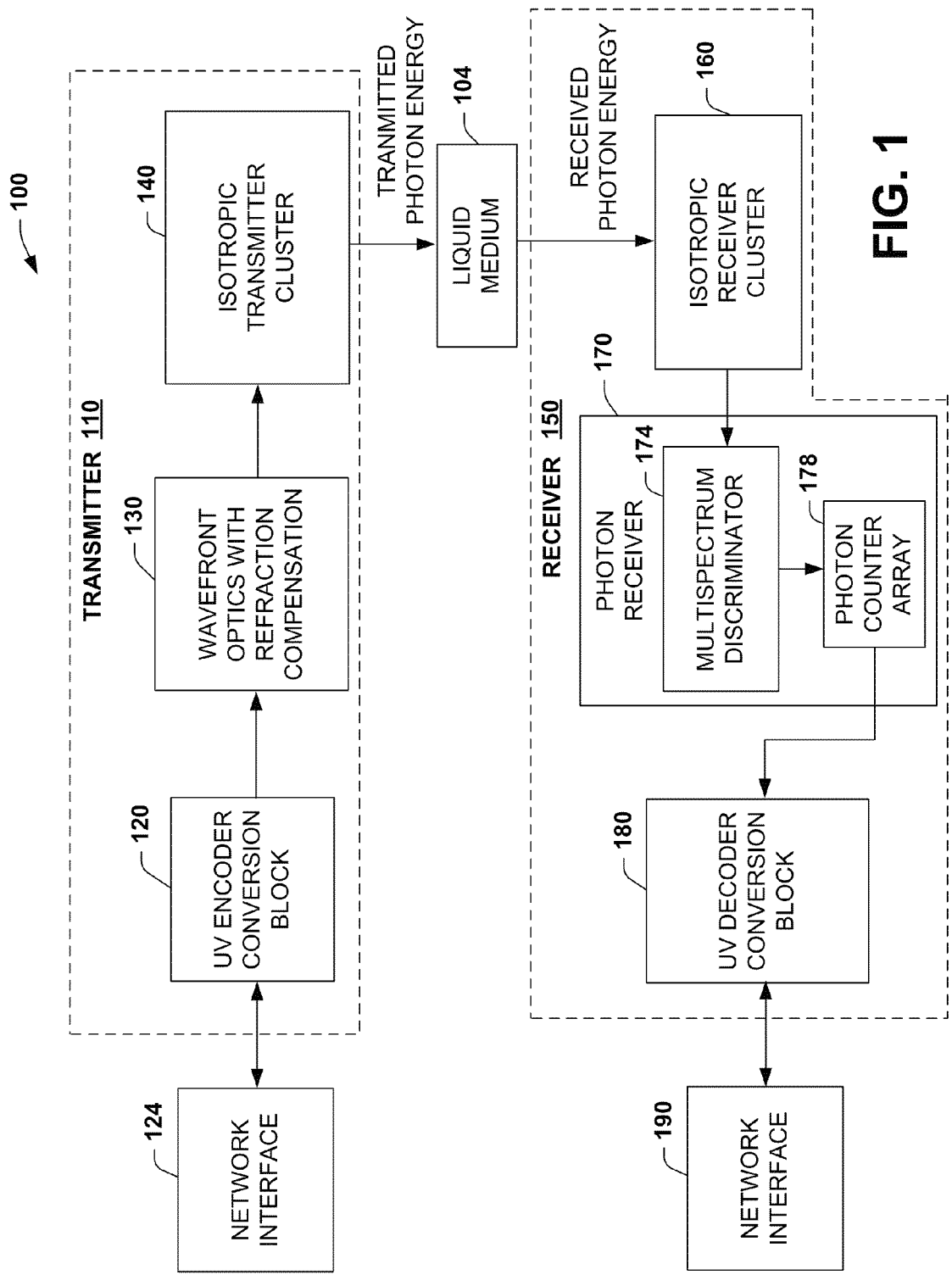
FIG. 1 illustrates an example of an extended range communication system for wireless communications in a liquid medium such as water.

FIG. 1 illustrates an example of an extended range communication system 100 for wireless communications in a liquid medium 104 such as water, for example. A transmitter 110 includes an ultraviolet (UV) encoder conversion block 120 that receives network data from a network interface 124 to generate a conversion output. The UV encoder conversion block 120 converts the network data to a modulated signal that drives a plurality of multi-spectrum sources inside the block (e.g., light sources having different frequencies) to generate the conversion output. A wave front optical component 130 receives the conversion output from the UV encoder conversion block 120 and generates an output beam in the ultraviolet or near ultraviolet wavelength. The wave front optical component 130 employs refraction compensation to mitigate absorption and scattering of the output beam in the liquid medium 104. An isotropic transmitter cluster 140 transmits the output beam received from the wave front optical component 130 as photon energy in the liquid medium 104. The isotropic transmitter cluster 140 includes at least two transmitting nodes to facilitate transmission of the photon energy in a plurality of directions in the liquid medium 104.

Situated at some distance through the liquid medium 104 and from the transmitter 110, a receiver 150 includes an isotropic receiver cluster 160 to receive photon energy having modulated network data from the liquid medium 104 and to generate cluster output data. The isotropic receiver cluster 160 includes at least two receiving nodes to facilitate reception of the photon energy from a plurality of directions in the liquid medium 104. A photon receiver 170 receives the cluster output data from isotropic receiver 160 and generates receiver output data. The photon receiver 170 includes a multi-spectrum discriminator 174 to filter and separate the received photon energy into individual spectrum bands. The photon receiver 170 also includes a photon counter array 178 to store the individual spectrum bands generated by the multi-spectrum discriminator into discrete receiving data elements in the array. An ultraviolet (UV) decoder conversion block decodes 180 the modulated network data from the discrete receiving data elements of the photon counter array where a network interface 190 receives messages that were generated from the network interface 124 via transmitter 110. Although only a single transmitter 110 and receiver are shown, bidirectional communications can also be supported between network interfaces 124 and 190 where each side of the communications path includes both a transmitter 110 and receiver 150 to enable message data flow in both directions across the liquid medium 104.

With respect to the transmitter 110, the network interface 124 accepts a plurality of Ethernet inputs in on example and converts the inputs to data to be converted by the UV encoder conversion block 120. This can include global network message processing such as via Internet protocols, for example. The UV encoder conversion block 120 can include a modulator that generates an On-Off Keying (OOK) waveform or Pulse-Position Modulation (PPM) waveform, for example, that include synchronization and preambles to modulate the plurality of multi-spectrum sources within the block. The multi-spectrum sources can include at least one of a laser, a light emitting diode, and a non-collimating beam, for example, to generate a plurality of concurrent wavelengths of light in the UV spectrum (or near UV) of about 380 nm to about 450 nm to increase data rate capability of the transmitter 110. In one specific example, the multi-spectrum sources can include a plurality of light emitting diodes (LEDs), each diode having a different wavelength, where the LEDs are configured as a cascade to provide the multi-spectrum source. A stabilized timing reference provides timing for symbol and frame formation for the UV encoder conversion block 120 to generate the conversion output.

The refraction compensation of the wave front optical component 130 can include a Diffraction-less Bessel Beam (DBB) to mitigate light absorption in the liquid medium. For example, the wave front optics 130 can include an Exicon lens where the DBB is generated by passing UV light through the Exicon lens. The Exicon lens can be polished to a taper specified by a non-linear function that is selected to place transmitted energy at a location along an optical axis. In an alternative example, the refraction compensation of the wave front optical component 130 can include a Negative Index of Refraction Material (NIM) to mitigate light absorption in the liquid medium 104. The NIM can include an optical material that employs gold nanostructure layers having a predetermined spacing between the layers (e.g., 70 nm spacing). Still yet other wave front optics can include an Axicon lens, gratings with slits, and/or a holographic generator. The isotropic transmitter cluster 140 can include a plurality of multicolor emitters to project photon energy in a spherical or hemispherical pattern of about 360 degrees, for example. The isotropic transmitter cluster 140 can include an icosidodecahedron pressure vessel to transmit an isotropic pattern of light in an underwater environment, for example.

With respect to the receiver 150, the discrete receiving data elements in the photon receiver 170 can be stored as interval-based photon counts in the photon counter array 178. The interval-based photon counts can be derived from a communications waveform based on Poisson/Skellam distributions to detect binary symbols in photon count data sequences, for example. The UV decoder conversion block 180 can include a module to decode an On-Off Keying (OOK) or a Pulse-Position Modulation PPM) sequence into network message data. The network interface 190 processes the network message data received from the UV decoder conversion block 180 via at least one of an Ethernet protocol or an Internet protocol, for example. Such communications between network interfaces 124 and 190 can include secure socket layers for security along with various encryption protocols, if desired. The isotropic receiver cluster 160 can include an N×M multicolor optical sensor to receive photon energy from the liquid medium, wherein N and M are positive integers. The isotropic receiver cluster 160 can also include an icosidodecahedron pressure vessel to receive an isotropic pattern of light in an underwater environment, for example.

In one example application, the system 100 employs UV light in about the 380 to 450 nanometer range to provide minimum attenuation in sea water thus, enabling longer distance communications while providing low probability of intercept and detection. Optical wave front engineering in the form of Diffraction-less Bessel Beams (DBB) or negative index of refraction using MetaMaterials (NIMs) can be applied to extend the operating range to 1 km or more at a 1 megabit/second or higher data rate. An undersea optical lens cluster coupled with isotropic multi-element photon counting arrays, enables practical application of this composite optical structure without the need for line-of-sight pointing.

An isotropic UV-based communication system can provide node-to-node connectivity for internet protocol (IP) networks. For example, undersea platforms and vehicles can automatically set up networks in a covert manor that does not reveal their location. Data rates of hundreds of kbps with bit error rates (BER) of $10^{-6}$ using nodes spaced hundreds of meters apart can be enabled with the systems described herein. Conventional wireless communication systems are commonly based on Gaussian Distribution Theory especially in the radio frequency (RF) region of the electromagnetic spectrum (EMS) however such processing would limit the range of the system 100. The system 100 provides a communication system based on photon energy using Poisson and Skellam Distributions thus leading to link budgets that predict photon counts per second at each point in the propagation path instead of absolute signal level in decibels as with conventional systems. A specialized communications waveform can be provided based on this alternative analytical approach. The availability of UV sources that emit light at selectable wavelengths in the UV and near UV band, optical NIMs and solid state channel photon multipliers (CPM) can be employed to facilitate efficient long range underwater communications.

The combination of wavelength selection, optical wave front engineering, a specialized waveform, and an isotropic lens cluster provide a longer range high data rate IP communication system for fixed position and on-the-move undersea platforms and vehicles, for example. Thus, submarines, surface ships, divers, underwater unmanned vehicles (UUV), and deep submerged operating platforms (DSOP) can benefit from networks formed utilizing UV light connectivity described herein.

Figure 2:
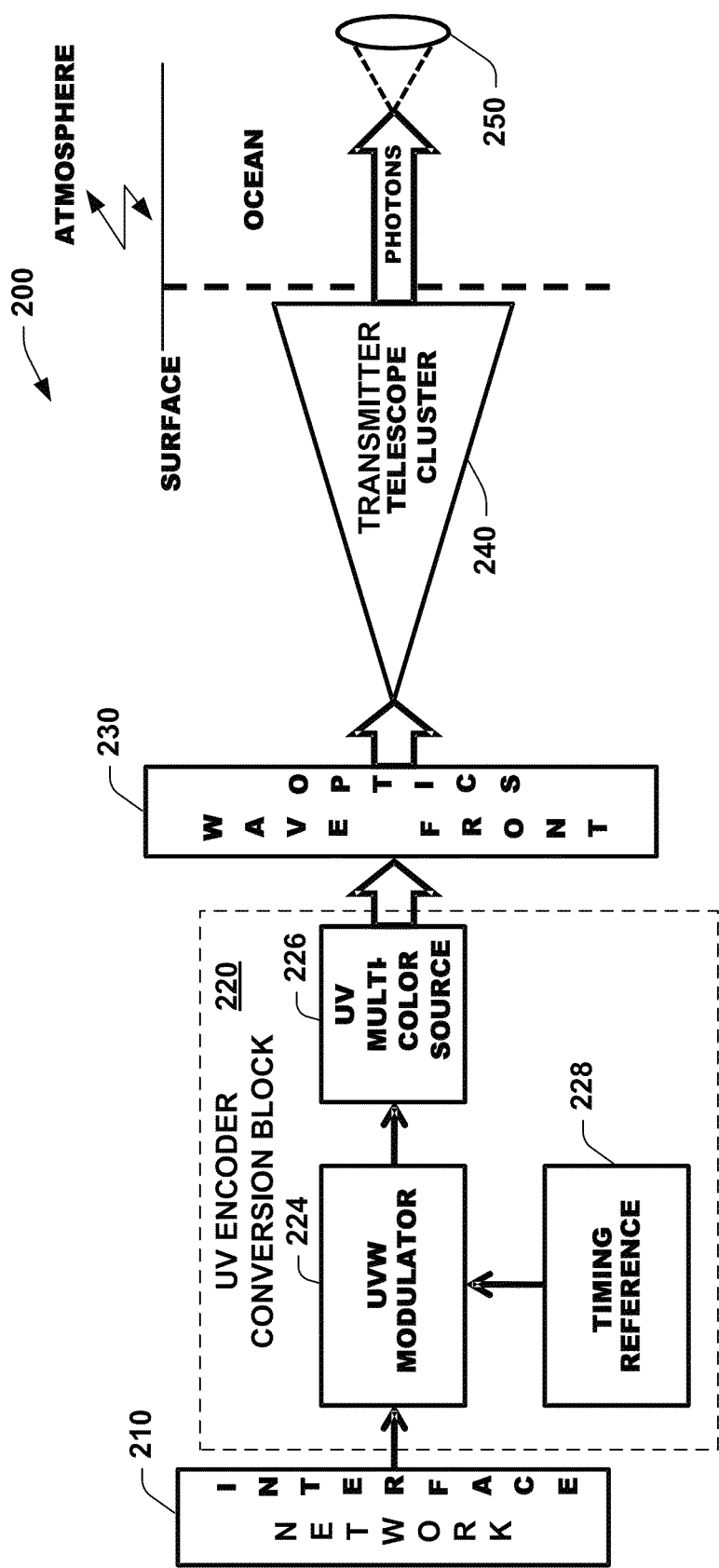
FIG. 2 illustrates an example of a transmitter for an extended range communication system for wireless communications in a liquid medium such as water.
Figure 3:
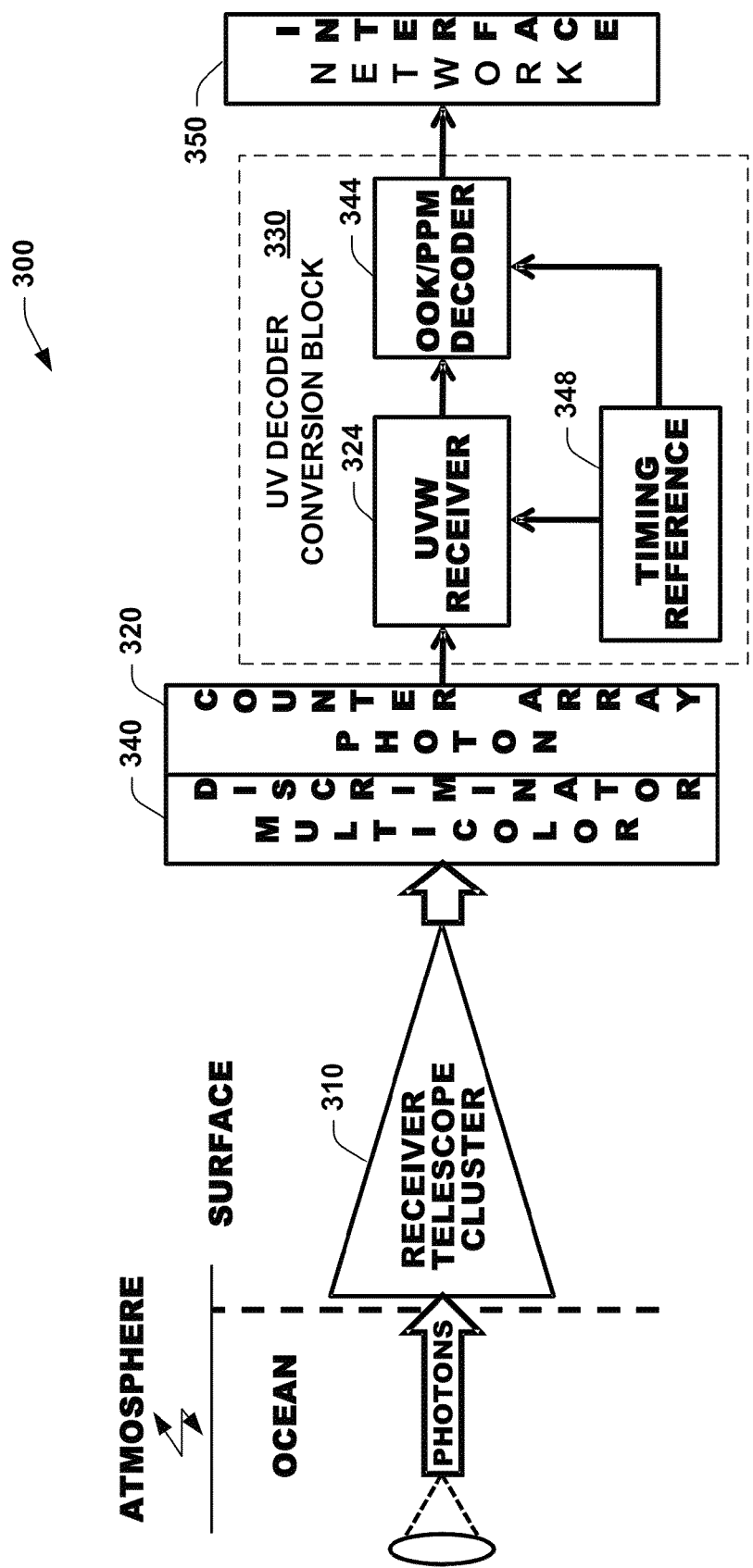
FIG. 3 illustrates an example of a receiver for an extended range communication system for wireless communications in a liquid medium such as water.

FIGS. 2 and 3 illustrate transmitter and receiver examples of an extended range communication system depicted in FIG. 1 for wireless communications in a liquid medium such as water. With respect to a transmitter 200 of FIG. 2, a network interface receives Internet Protocol (IP) message packets from a source such as a computer (not shown). The IP packets can include any type information can be converted to return to zero (RZ) streaming bits (See discussion relating to FIGS. 4 and 5) and routed to a UV encoder conversion block 220. As shown, the UV encoder conversion block 220 can include a UV wave (UVW) transmit modem 224 where on-off keying (OOK) or pulse-position modulation (PPM) modulation can occur. The transmit modem 224 provides on-off switching of a multi-color (also referred to as multi-spectrum) encoded UV source 226 which can be a laser, an LED array, and/or a non-collimated beam, for example. A stabilized timing reference 228 can be provided to drive the UVW modulator 224. A tailored wave front can be created by processing UV light from the UV source 226 through wave front optics 230. The wave front optics 230 can include an axicon lens, an exicon lens, gratings having optical slits, a holographic generator, and/or optical NIMs devices as previously described. The wave front beam from the optics 230 is optically routed to a lens cluster 240 (e.g., transmitter telescope cluster) where isotropic diffraction-less or NIM beam emission can occur in a liquid medium such as the ocean, for example. The lens cluster 240 outputs photon energy into the ocean in a substantially conical pattern 250 where photons are subjected to absorption and scattering and whose combined effect is referred to as attenuation. The systems described herein exploit the phenomenon that minimum attenuation of light in the ocean environment occurs at a wavelength between about 380 and about 450 nanometers.

Referring now to a receiver 300 of FIG. 3, photon energy can be detected using a receiver undersea lens cluster (e.g., receiver telescope cluster) 310 and similar to the transmitter cluster described above. The receiver cluster 310 focuses the collected photon energy on a photon counter array 320 which combines photon counts from each array element for routing to a UVW signal processor receiver 324 in a UV decoder conversion block. A multi-color discriminator (also referred to as a multi-spectrum discriminator) filter bank 340 proceeds the photon counting array 320 and separates the UV photon energy into individual bands. Multi-color/spectrum operation greatly increases the information bandwidth of the system. The UVW receiver 324 outputs a bit stream in an OOK or PPM format, which is decoded by a PPM or OOK decoder 344. A stabilized timing reference 348 drives the receiver 324 and decoder 344. The decoded bit stream can be reformatted into IP packets by a network interface 350 which can be connected to a computing device and/or routed to other networks. The receiver timing reference 348 manages synchronization between transmit and receive operations described herein.

Figure 4:
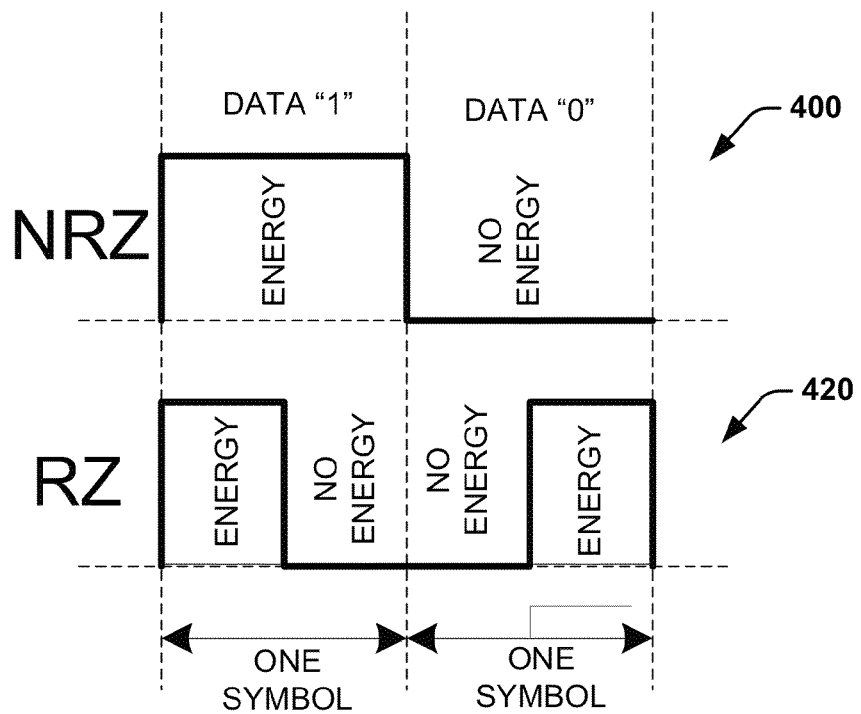
FIGS. 4 and 5 illustrate example messaging symbols and waveforms that can be encoded and decoded via the encoder and decoder conversion blocks of FIGS. 1 through 3.
Figure 5:
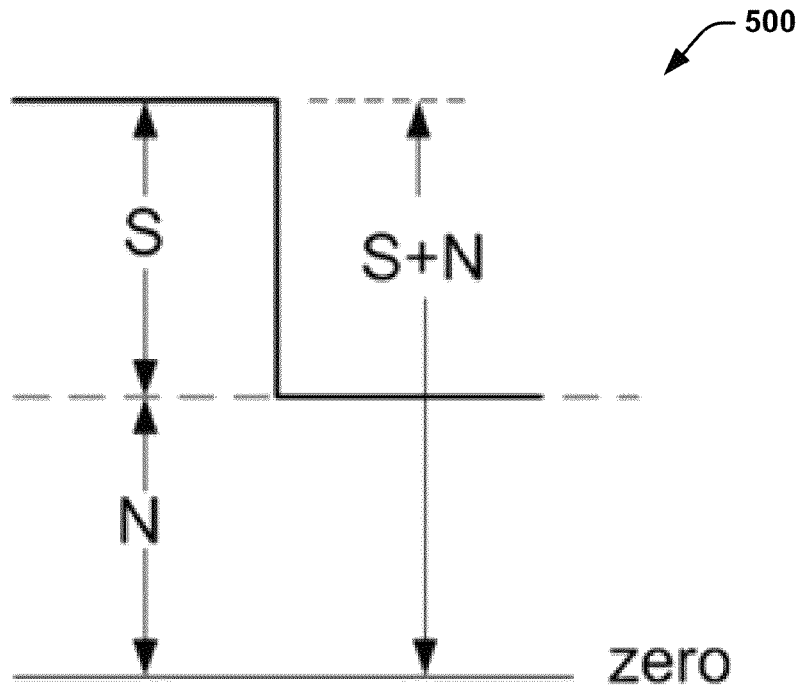

FIGS. 4 and 5 illustrate example messaging symbols and waveforms that can be encoded and decoded via the encoder and decoder conversion blocks of FIGS. 1 through 3. FIG. 4 illustrates an RZ symbol waveform 420 along with an NRZ symbol waveform 400 for providing symbol formats in accordance with the encoding and decoding systems described herein. As illustrated in FIG. 4 with respect to the NRZ symbol format 400, a first logic state (e.g., logic "1" state) can be provided by transmitting energy (on-state) over a predetermined time period, while a second logic state (e.g., logic "0" state) can be provided by not transmitting energy (off-state) over a predetermined time period. As illustrated in FIG. 4 with respect to the RZ symbol format 400, a first logic state (e.g., logic "1" state) can be provided by transmitting energy (on-state) over a first time interval of a predetermined time period followed by not transmitting energy (off-state) over a second time interval of the predetermined period, and a second logic state (e.g., logic "0" state) can be provided by not transmitting energy (off-state) over a first time interval of a predetermined time period followed by transmitting energy (on-state) over a second time interval of the predetermined time period.

The RZ symbol format has a number of distinct advantages over the NRZ symbol format, such as a fixed 50% duty cycle, self clocking (there is at least one transition in every symbol), and self thresholding (energy and no-energy states occur in every symbol). Although the following examples will be illustrated with respect to the RZ symbol format, it is to be appreciated other embodiments could employ the NRZ symbol format, or other symbol formats (e.g., higher order symbol formats). This can include mapping between symbol formats such as mapping RZ to NRZ and/or mapping NRZ to RZ symbol format.

In general, photon counts can be made during each half of the RZ symbol received at the photon counting array described above with respect to FIG. 3. One half of the RZ symbol can include counts generated by the received optical energy summed with the internal noise counts generated by the detector. The mean value will be S+N. The other half of the RZ symbol will have counts from the detector noise alone with its mean value being N. The relationship is shown for one RZ symbol in the waveform 500 in FIG. 5. The demodulator can check the counts with a predetermined count value to determine if the half of the RZ symbol is in the on-state or off-state.

Bit decisions for decoding symbols can use the following simple rule: compare the number of counts in the first half and second half of the symbol; if the first half is larger, the symbol is declared to be a first logic state (e.g., logic "1"), and if the second half is equal or larger, the symbol is declared to be a second logic state (e.g., logic "0"). For example, when a logic "1" is sent, the counts in the first half will have a mean value equal to the sum of means of the received signal and of the detector noise generated during that time interval of a given time period; and the counts in the second half will have a mean value equal to that of the detector noise alone in the second time interval of the given time period. As shown in FIG. 5, Pois(S+N) denotes the Poisson process during the signal half of the symbol and Pois(N) denotes the Poisson process during the noise only half. It is to be appreciated that the logic states can be reversed such that a logic "1" is based on energy being received in the second half of the symbol and a logic "0" being based on energy being received in the first half of the symbol. Timing errors between the sampling process and the incoming waveform can be estimated by measuring the symmetry of a matched filter's output waveform residing in the receiver demodulator.

Figure 6:
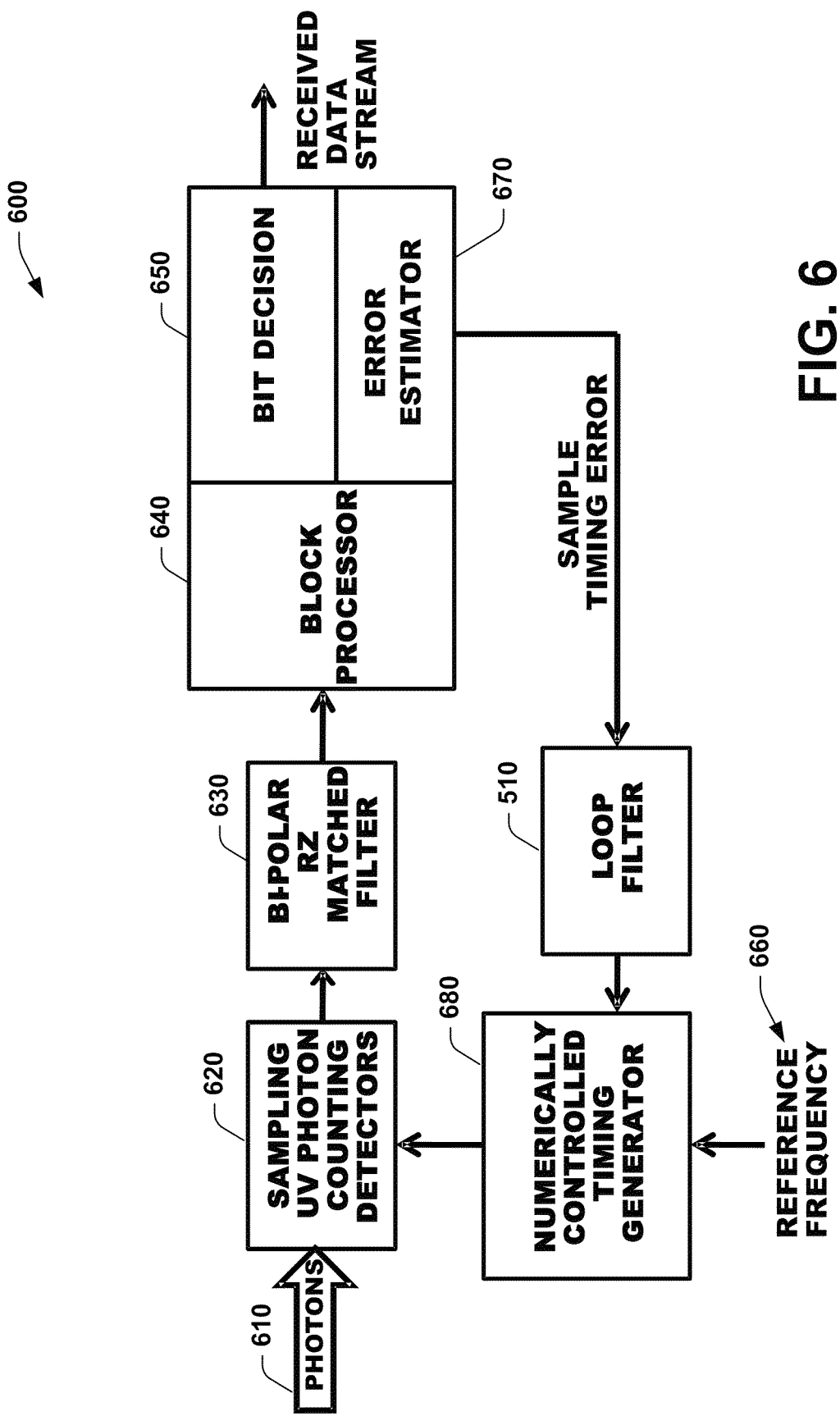
FIG. 6 illustrates an example of an ultraviolet waveform (UVW) receiver for an extended range communication system for wireless communications in a liquid medium.
Figure 7:
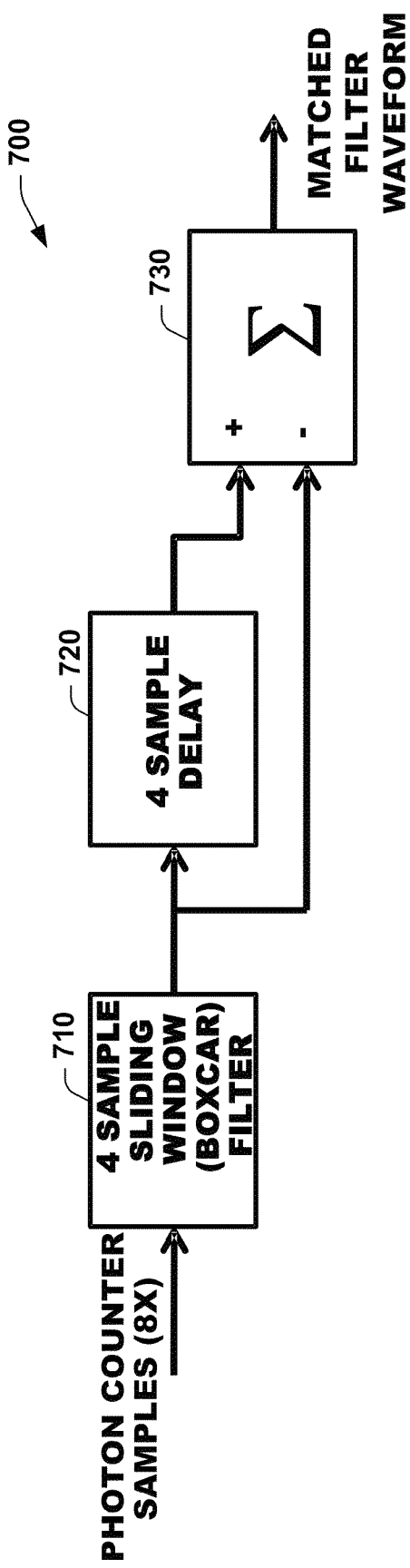
FIG. 7 illustrates an example of a sliding window matched filter to detect RZ symbols for an extended range communication system for wireless communications in a liquid medium.
Figure 8:
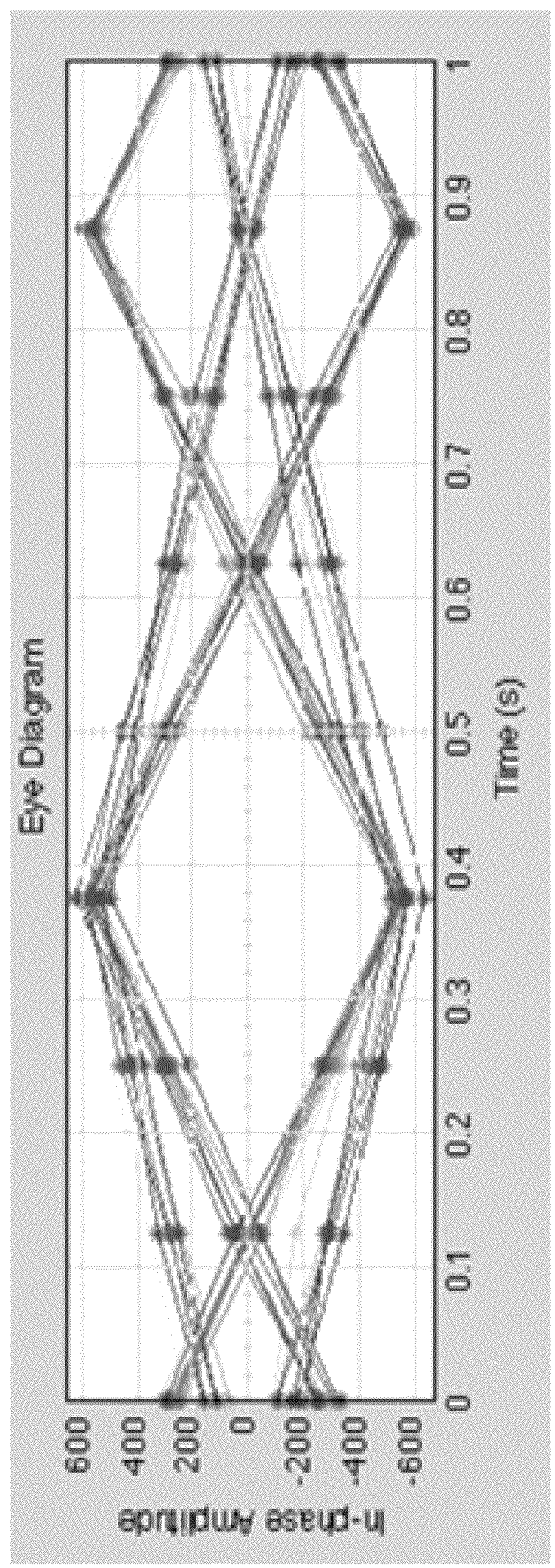
FIG. 8 is an eye diagram associated with a detection process for an extended range communication system for wireless communications in a liquid medium.

FIG. 6 illustrates an example of an ultraviolet waveform (UVW) receiver 600 for an extended range communication system for wireless communications in a liquid medium. The UVW receiver 600 is based on photon counting and its theory of operation is based on Poisson distribution mathematics instead of the usual Gaussian distribution associated with classical communication theory. Received RZ symbol waveform photon count samples at 610 are sampled via counting detectors 620 at a rate of eight samples (or other number) per data bit and match filtered via match filter 630 with a bi-polar waveform to remove DC offset. A bi-polar matched filter 700 is shown in FIG. 7 and uses a four sample sliding boxcar filter 710, a four sample delay line 720 and a subtraction operation 730, for example (other sample numbers than 4 are also possible). A typical eye diagram for the matched filter waveform at 3 db SNR is shown in FIG. 8.

Referring back to FIG. 6, a sixty four sample block processor 640 processes samples representing eight data bits as a group as shown in FIG. 9. The samples are organized into a 64 element array. Samples positions from each bit can be aligned by columns or rows depending upon which is easier to manipulate with a DSP processor. The array example shown in FIG. 9 fills each column in succession. Other array and sample sizes are also possible.

Figure 10:
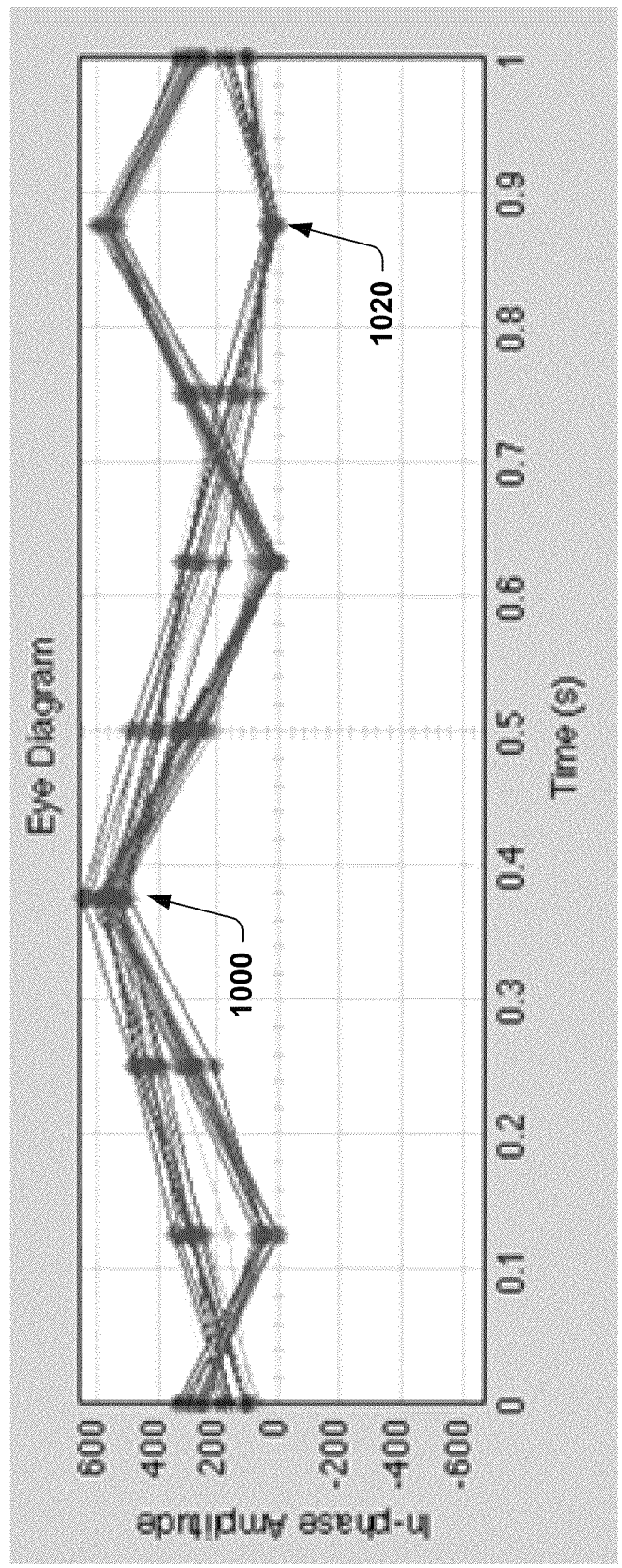
FIG. 10 is an eye diagram associated with a detector array for an extended range communication system for wireless communications in a liquid medium.

Referring back to FIG. 6, bit decisions 650 are made by identifying the sample position across the group of bits that has the highest overall energy. The eight waveform values corresponding to this position in each bit's samples can be mapped to the NRZ format described above. Errors in timing and phasing between the received waveform and a local clock 660 can be estimated using information provided by the matched filtered waveform. An error estimate is generated by an error estimator 670 using sample data from the last (most current) bit in each processed block. It is used to control a numerically controlled oscillator (NCO) 680 that produces the receiver sample clock. A loop filter 690 (e.g., digital filter) can be provided to filter sample timing error from the error estimator 670. An example eye diagram for the array is shown in FIG. 10. The sample position with the highest energy at 1000 and the sample position used to estimate the timing error at 1020 are indicated in the eye diagram.

The UVW receiver 600 has suitable performance in the photon counting environment since it "is self thresholding" (energy and non-energy states occur in every symbol) which is a factor to its operation. The processes of light energy generation and of detector noise generation are both Poisson distributions whose characteristics are significantly different from the Gaussian distributions generally used to describe radio frequency (RF) based transmissions of conventional systems. To emphasize these differences, a new descriptor, OP(S,N), is introduced as an alternative to signal-to-noise ratio (S/N). The descriptor OP(S,N) denotes the operating point at the signal count value of S and noise count value of N. Since Poisson distributed processes are equivalent to counting events, only positive counts are generally relevant and therefore signal counts can ride above the noise count.

Another aspect of increasing communications distance in a liquid medium such as water relates to the wave front optics described above with respect to FIGS. 1-3. The optical system uses non-traditional wave front modifications to extend the communication range of operation by creating diffraction-less beams that preserve the photon energy in the presence of absorption and scattering. An alternate range extension technique utilizes negative index material (NIM) to negate the absorption of light in water by creating a negative index of refraction that immunizes photons to absorption in positive refraction index media (e.g., water).

As an example, one such wave front referred to as the Bessel Beam will be described to illustrate how the optics in one example, uses Diffraction-less Bessel Beams (DBB) to extend the projection range of photon energy in an underwater environment. The embodiments disclosed herein are not limited to using DBBs as optical range extenders in absorbing media but encompasses all forms of wave front modifications that extend the communication range of the emitted photon energy.

Absorption of light in a linear medium described by Beer's law is a fundamental property of matter limiting light propagation. Building absorption-resistant light beams involves choosing the phase response of an optical element such that it compensates for the exponential decay of the beam in the absorbing media (e.g., refraction compensation). Such optical elements in some examples are referred to as exponential intensity Exicon lens or mirrors. These optical elements produce an absorption-free or diffraction-less beam over a predetermined range based on DBB wave front configurations. They achieve this by redistributing different beam-lets or parts of the incident beam in such a manner that their superposition produces a pattern whose transverse size is constant over a finite distance (e.g., diffraction-free beam) or whose intensity is substantially constant over a predetermined distance in an absorbing medium.

Figure 11:
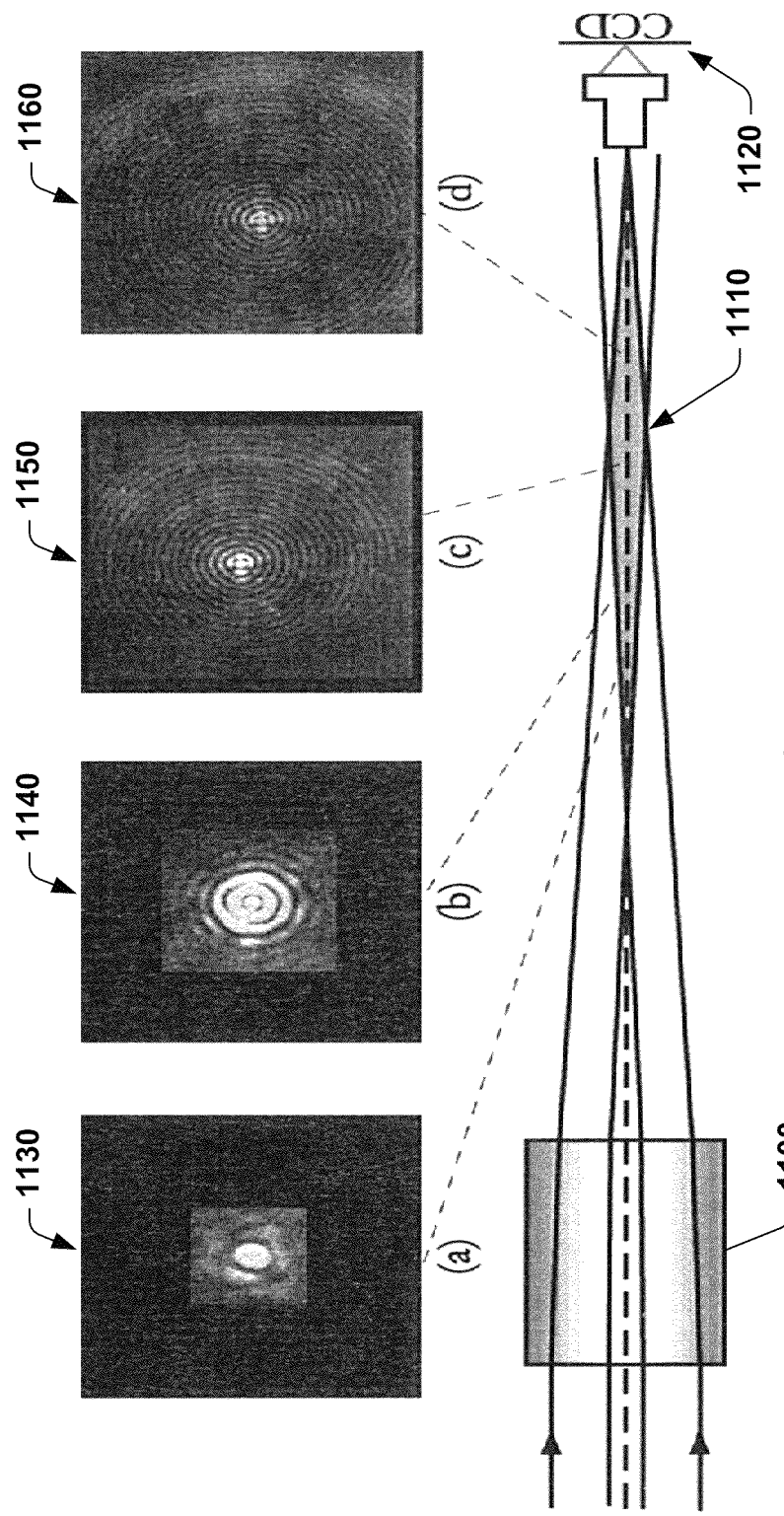
FIG. 11 illustrates a ray trace and cross section of light created by an Exicon lens in an absorptive media for an extended range communication system for wireless communications in a liquid medium.

FIG. 11 illustrates how a DBB can be implemented as an Exicon Lens 1100 to create a light beam that is self-healing in the presence of absorption. The DBB can be created by passing a collimated light beam through the Exicon lens 1100, however a similar effect can be realized using gratings or holograms. In the case of an absorbing medium (e.g., absorption-free beam) such as water, more power from parts of the incident beam are focused further along the optical path in order to compensate for the loss or absorption. FIG. 11 illustrates the uncompensated propagation of light in water at 1110, the energy focus of an Exicon lens at 1120, and the constant light intensity created by light superposition created by the Exicon lens over a predetermined range shown at image 1130. The Exicon lens 1100 creates annular rings whose number increases as the light propagates down the optical axis shown at 1140, 1150, and 1160. The rings form the self-healing characteristic that continues to carry photon energy although obstructed by particles or absorbed by water molecules.

Figure 12:
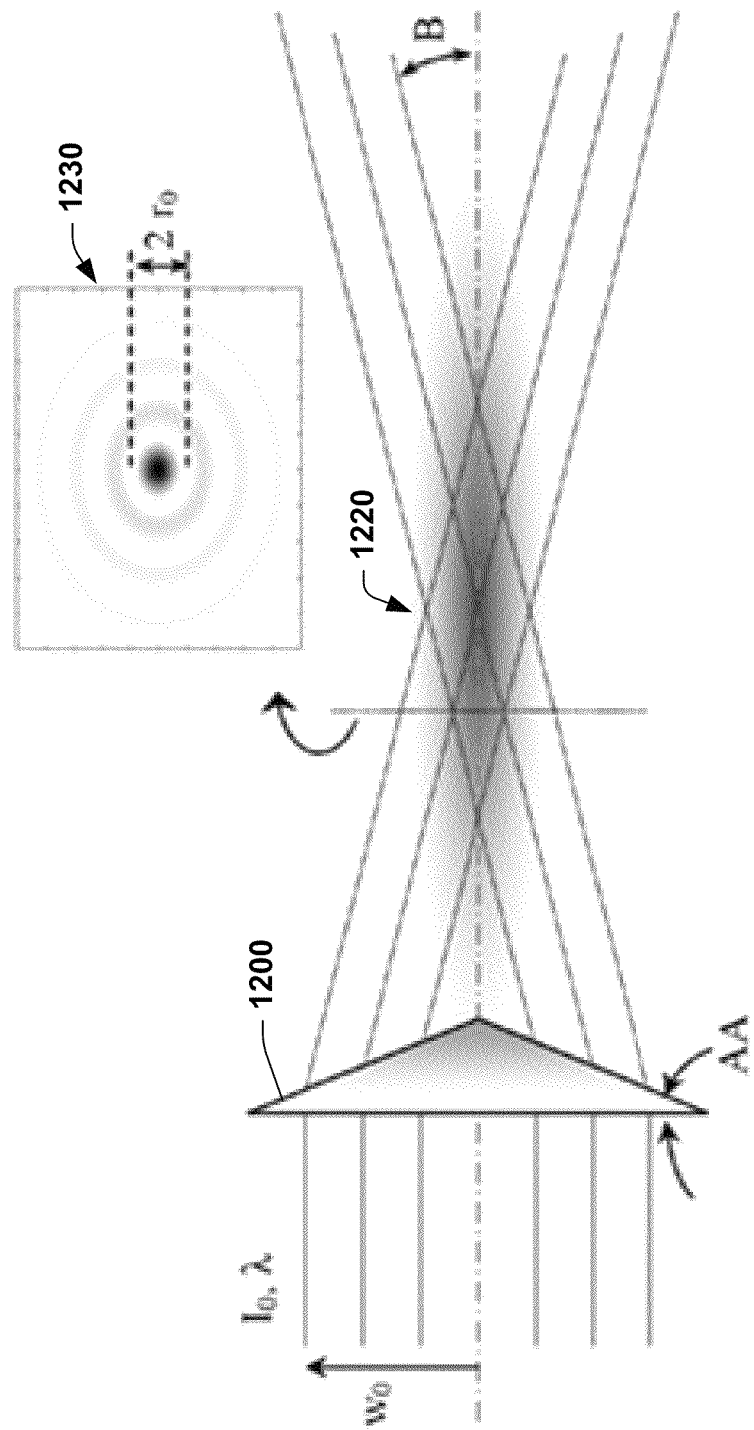
FIG. 12 illustrates concentration of energy along an optical path created by an Exicon lens for an extended range communication system for wireless communications in a liquid medium.

FIG. 12 illustrates concentration of energy along an optical path created by an Exicon lens 1200. The Exicon lens 1200 can be characterized by three parameters, namely, its base radius W0, its conic angle AA, and a factor β of the desired on-axis exponential intensity in free-space $E(z)=\exp(\beta z)$, where d1<z<d2, and where d1 and d2 are the start and stop focal region. The Exicon focal length shown at 1220 is the distance along the optical axis that has the highest concentration of photon energy after which the photon energy decreases rapidly shown at ring diagram 1230.

An example of an alternative configuration of extending the optical range even further is the use of NIM devices to compensate for the complex index of refraction for an absorptive media. The index of refraction in a media is given by N=n+ino where n is the refraction part of the index and no is the absorption part of the index. An optical NIM capable of creating an index Nn=−n−ino will set N to zero and create a suitable tunnel through media (e.g., permittivity and permeability=0).

FIG. 13 illustrates an optical negative index of material having such properties. An individual NIM element is shown at 1300 that employs gold nanotechnology where a U-shaped structure is formed with a height of about 380 nm, a width of about 430 nm, and leg width of about 80 nm, for example. Such structures can be formed as layers as depicted at 1310 with an example spacing of about 70 nm between layers. By producing this type MetaMaterial, a substantially absorption-free tunnel can be created that extends the operating range of wireless communications by reducing the effects of light absorption by the water molecules. It is noted that this embodiment is not limited to NIMs implementation for any specific wavelength but encompasses all such materials used monotonically or multicolor to compensate for the absorption properties of water.

FIG. 14 illustrates an example configuration for icosidodecahedron transceiver pressure vessel. Another aspect of the systems described herein is the isotropic emission and reception of light to and from the transmitter and receivers described above. To achieve this, an icosidodecahedron pressure vessel 1400 can be composed of twelve (or other number) pentagonal surfaces and twenty triangular surfaces, for example. The pentagonal surfaces are dedicated to the optical transmitters at 1410 and the triangular surfaces are dedicated to the optical receivers at 1420. An internal configuration of the vessel 1400 is shown at 1450 which includes two types of canisters (e.g. transmit canister 1460 and receive canister 1470) in addition to associated heat sinks, driver electronics and photon detector arrays, and so forth. The pressure vessel has an 800 transmit etendue and a 480 receive etendue, for example, to enable 360 degree spherical coverage thus creating isotropic emission and reception.

Figure 15:
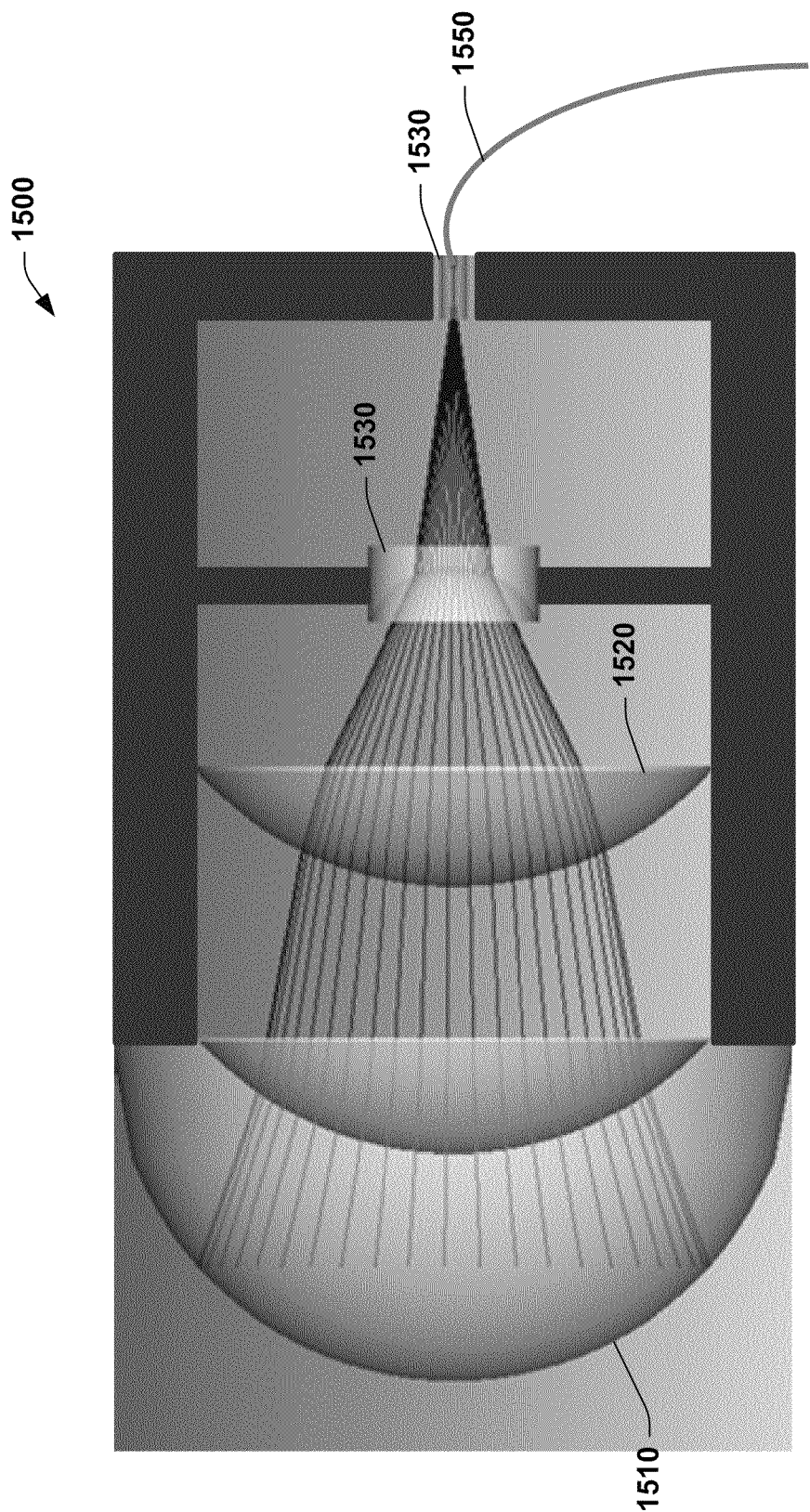
FIG. 15 illustrates an example receive canister and its associated optical components for an extended range communication system for wireless communications in a liquid medium.

FIG. 15 illustrates a receive canister 1500 and its associated optical components. A spherical dome lens window 1510 collects light over a 480 degree view. The light is then focused to a narrow beam by a convex lens 1520 and concave lens 1530. This process creates a sub millimeter beam that is focused onto a collimator 1540 that interfaces to a fiber-optics link 1550 to the photon counting detector. The fiber optic links from each of the receivers (e.g., 20) are bundled together and coupled to one photon counting detector. The combined count is transferred to the processor that executes the UVW waveform decoding. The embodiments disclosed herein are not limited to twenty optical receivers bundled to one photon detector but encompasses all such configurations involving a plurality of receive canisters and their associated optics for the purpose of obtaining isotropic reception of light in an underwater environment.

Figure 16:
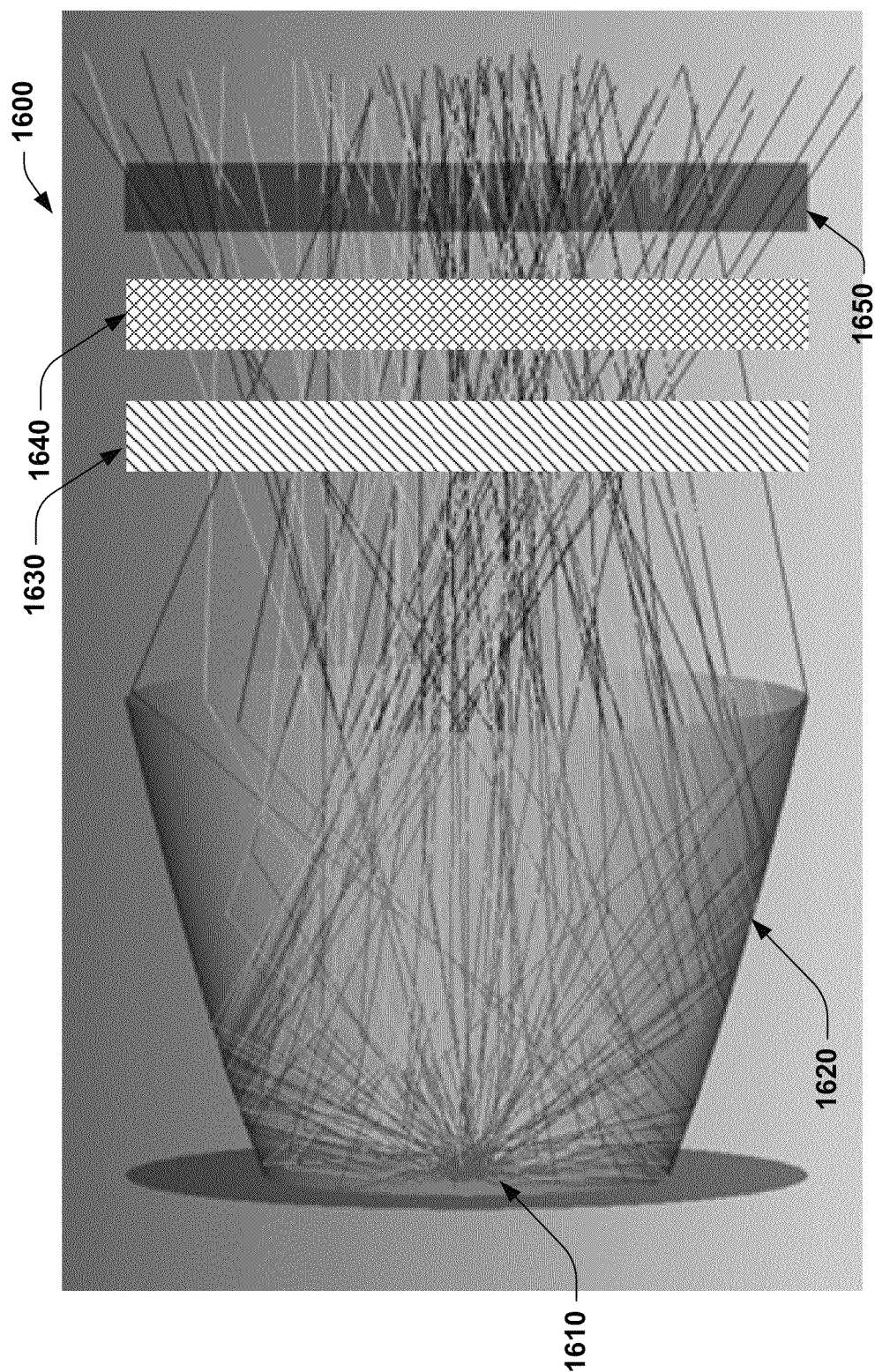
FIG. 16 illustrates an example transmit canister and its associated optical components for an extended range communication system for wireless communications in a liquid medium.

FIG. 16 illustrates a transmit canister 1600 and its associated optical components. High powered multicolor LEDs at 1610 are positioned in a parabolic reflector 1620. An Exicon lens 1630 and associated collimator 1640 are placed at the other end of the reflector. The reflector 1620 is tuned to an 800 etendue to facilitate isotropic coverage. A protective window 1650 is placed at the far end of the canister 1600 to seal the pressure vessel. It is noted that the embodiment disclosed herein is not limited to twelve optical transmitters but encompasses all such configurations involving a plurality of transmit canisters and their associated optics for the purpose of obtaining isotropic transmission of light in an underwater environment.

An another aspect for wireless communication is providing an AD-Hoc network protocol tailored for undersea operation based on application of the UVW waveform and multicolor emitting devices described above. In one example, the systems described herein can use a modified version of the 802.11 protocol, for example, for the purpose of creating an AD-Hoc network based on nodes formed by the aforementioned isotropic transceiver. One modification to the protocol involves the utilization of node address based on a multicolor code. Since different wavelengths of light do not interfere with one another, codes created by mixing wavelengths can be used instead of the usual IP4 or IP6 standards. The multicolor aspect of the network configuration both increases the bandwidth and simplifies the identification of each node. The embodiment disclosed herein is not limited to network configurations solely based on a modified 802.11 protocol, but encompasses all such AD-Hoc network protocols when used in conjunction with the UVW transceiver and receiver disclosed herein.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A transmitter comprising:
   an ultraviolet (UV) encoder conversion block that receives network data from a network interface to generate a conversion output, wherein the UV conversion block converts the network data to a modulated signal that drives a plurality of multi-spectrum sources to generate the conversion output;
   a wave front optical component to receive the conversion output from the UV encoder conversion block and generate an output beam, wherein the wave front optical component employs refraction compensation to mitigate absorption and scattering of the output beam in a liquid medium; and
   an isotropic transmitter cluster to transmit the output beam received from the wave front optical component as photon energy in the liquid medium; wherein the isotropic transmitter cluster includes at least two transmitting nodes to facilitate transmission of the photon energy in a plurality of directions in the liquid medium.

2. The transmitter of claim 1, wherein the network interface accepts a plurality of Ethernet inputs and converts the inputs to data to be converted by the UV encoder conversion block.

3. The transmitter of claim 1, wherein the plurality of multi-spectrum sources includes at least one of a laser, a light emitting diode, and a non-collimating beam to generate a plurality of concurrent wavelengths of light in the UV spectrum of about 380 nm to about 450 nm to increase data rate capability of the transmitter.

4. The transmitter of claim 3, further comprising a plurality of light emitting diodes (LEDs), each diode having a different wavelength, wherein the plurality of LEDs are configured as a cascade to provide the multi-spectrum source.

5. The transmitter of claim 1, further comprising a stabilized timing reference device to provide timing for symbol and frame formation for the UV encoder conversion block to generate the conversion output.

6. The transmitter of claim 1, wherein the refraction compensation of the wave front optical component further comprises a Diffraction-less Bessel Beam (DBB) to mitigate light absorption in the liquid medium.

7. The transmitter of claim 6, further comprising an Exicon lens, wherein the DBB is generated by passing UV light through the Exicon lens.

8. The transmitter of claim 7, wherein the Exicon lens device is polished to a taper specified by a non-linear function that is selected to place transmitted energy at a location along an optical axis.

9. The transmitter of claim 1, wherein the refraction compensation of the wave front optical component further comprises a Negative Index of Refraction Material (NIM) to mitigate light absorption in the liquid medium.

10. The transmitter of claim 9, wherein the NIM further comprises an optical material that employs gold nanostructure layers having a predetermined spacing between the layers.

11. The transmitter of claim 1, wherein the refraction compensation of the wave front optical component further comprises at least one of an Axicon lens, a grating with optical slits, and a holographic generator to mitigate light absorption in the liquid medium.

12. The transmitter of claim 1, wherein the isotropic transmitter cluster includes a plurality of multicolor emitters to project photon energy in a spherical or hemispherical pattern of about 360 degrees.

13. The transmitter of claim 12, wherein the isotropic transmitter cluster further comprises an icosidodecahedron pressure vessel to transmit an isotropic pattern of light in an underwater environment.

14. A receiver comprising:
   an isotropic receiver cluster to receive photon energy having modulated network data from a liquid medium and to generate cluster output data; wherein the isotropic receiver cluster includes at least two receiving nodes to facilitate reception of the photon energy from a plurality of directions in the liquid medium;
   a photon receiver that receives the cluster output data from isotropic receiver and generates receiver output data, the photon receiver further comprising:
      a multi-spectrum discriminator to filter and separate the received photon energy into individual spectrum bands; and
      a photon counter array to store the individual spectrum bands generated by the multi-spectrum discriminator into discrete receiving data elements in the array; and
   an ultraviolet (UV) decoder conversion block to decode the modulated network data from the discrete receiving data elements of the photon counter array.

15. The receiver of claim 14, further comprising a network interface device that processes network message data via at least one of an Ethernet protocol or an Internet protocol.

16. The receiver of claim 15, wherein the isotropic receiver cluster includes an N×M multicolor optical sensor to receive photon energy from the liquid medium, wherein N and M are positive integers.

17. The receiver of claim 16, wherein the isotropic receiver cluster further comprises an icosidodecahedron pressure vessel to receive an isotropic pattern of light in an underwater environment.

18. A system comprising:
   a UV encoder conversion block that receives network data from a network interface to generate a conversion output, wherein the UV conversion block converts the network data to a modulated signal that drives a plurality of multi-spectrum sources to generate the conversion output;
   a wave front optical component to receive the conversion output from the UV conversion block and generate an output beam, wherein the wave front optical component employs refraction compensation to mitigate absorption and scattering of the output beam in a liquid medium;
   an isotropic transmitter cluster to transmit the output beam received from the wave front optical component as photon energy in the liquid medium; wherein the isotropic transmitter cluster includes at least two transmitting nodes to facilitate transmission of the photon energy in a plurality of directions in the liquid medium; and
   an isotropic receiver cluster to receive photon energy having modulated network data from the liquid medium and to generate cluster output data; wherein the isotropic receiver cluster includes at least two receiving nodes to facilitate reception of the photon energy from a plurality of directions in the liquid medium.

19. The system of claim 18, further comprising a photon receiver that receives the cluster output data from isotropic receiver and generates receiver output data, the photon receiver further comprising:
   a multi-spectrum discriminator to filter and separate the received photon energy into individual spectrum bands; and
   a photon counter array to store the individual spectrum bands generated by the multi-spectrum discriminator into discrete receiving data elements in the array.

20. The system of claim 19, further comprising:
   an ultraviolet (UV) decoder conversion block to decode the modulated network data from the discrete receiving data elements of the photon counter array;
   a first network interface to receive network messages from the UV decoder conversion block, the first network interface employs at least one of an Ethernet protocol or an Internet protocol to receive the messages; and
   a second network interface to generate network messages for the UV encoder conversion block, the second network interface employs at least one of an Ethernet protocol or an Internet protocol to transmit the messages.

* * * * *